UNITED STATES PATENT OFFICE.

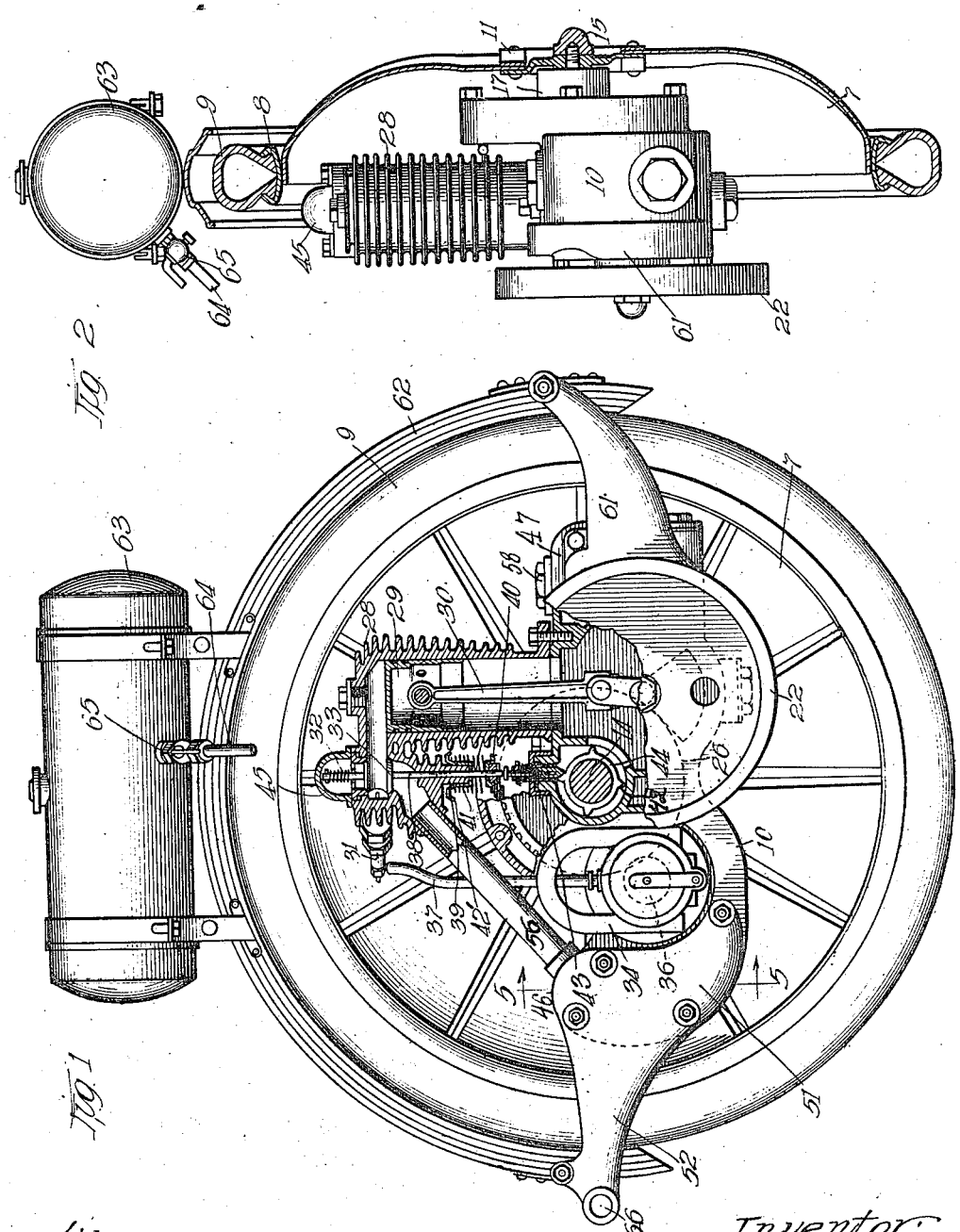

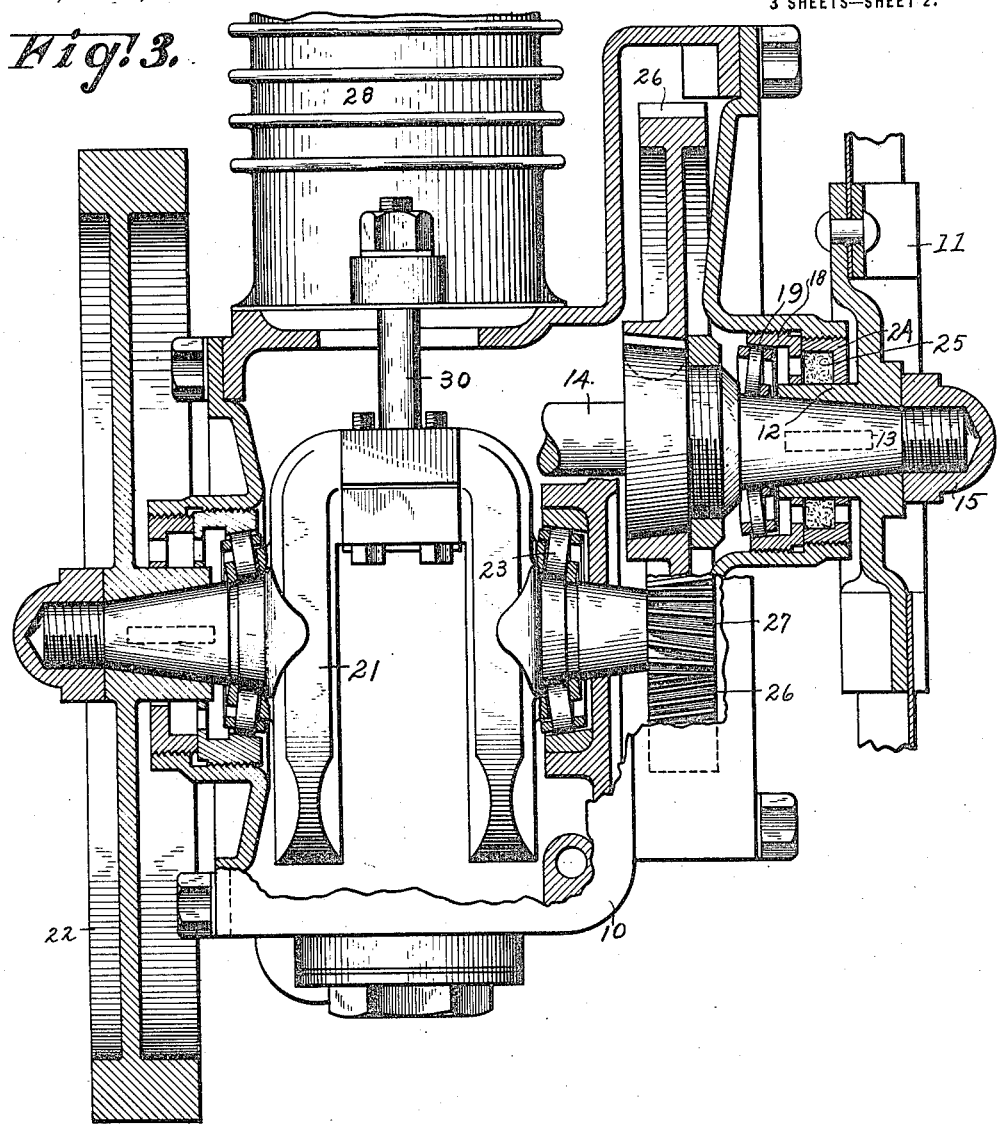

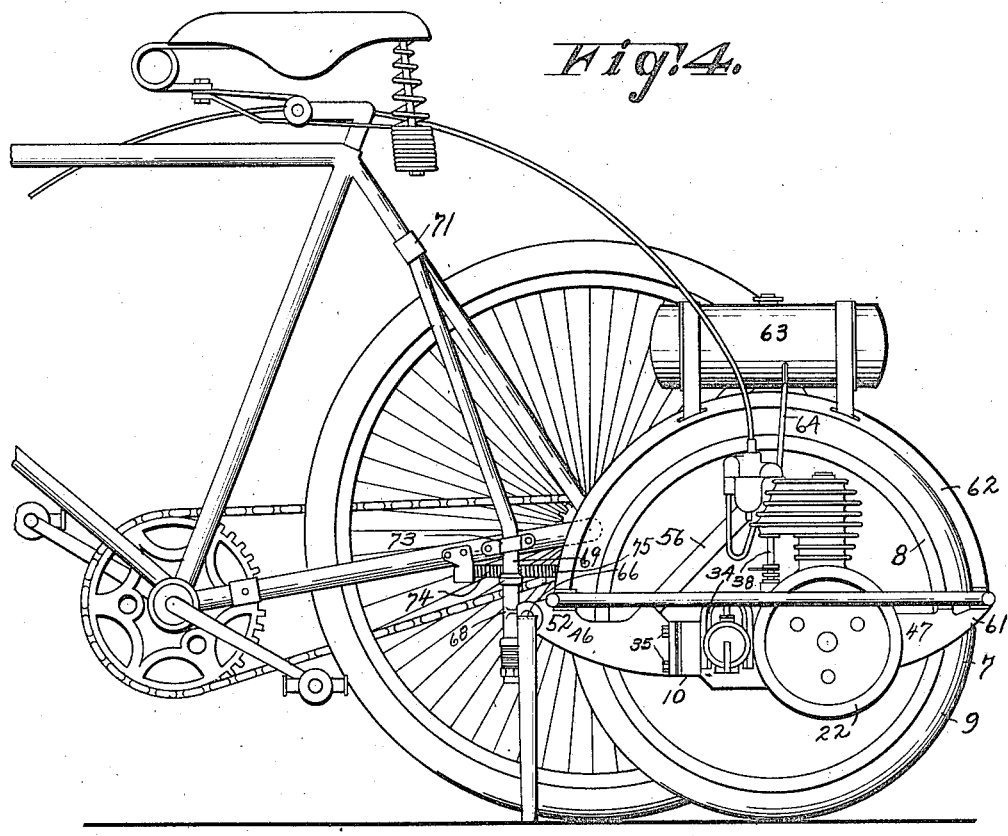

REUBEN STANLEY SMITH, OF MILWAUKEE, WISCONSIN, ASSIGNOR TO A. O. SMITH COMPANY, OF MILWAUKEE, WISCONSIN, A CORPORATION OF WISCONSIN.

MOTOR-CARRYING TRACTOR UNIT.

1,176,931.     Specification of Letters Patent.     Patented Mar. 28, 1916.

Original application filed August 20, 1914, Serial No. 857,692. Divided and this application filed April 14, 1915. Serial No. 21,403.

*To all whom it may concern:*

Be it known that I, REUBEN STANLEY SMITH, a citizen of the United States, residing at Milwaukee, county of Milwaukee, and State of Wisconsin, have invented new and useful Improvements in Motor-Carrying Tractor Units, of which the following is a specification.

This application is a division of a former application filed by me August 20, 1914, Serial No. 857692, for a bicycle pusher.

The primary object of the invention herein described is to provide a single wheel motor carrying tractor unit which will be sensitive or responsive to guiding control and which will not resist or interfere with the turning movements of a vehicle which is dependent upon locomotion and upon balancing movements of the rider to maintain its equilibrium in an upright position. In said former application, my improved tractor unit is illustrated and claimed as a pushing attachment for a bicycle, and connecting members are shown, described and claimed which not only permit the tractor unit to move in a vertical plane independently of the bicycle, but which also allow a turning movement with reference to the frame of the bicycle, whereby the wheel is permitted to travel along a circular path concentric with that in which the rear wheel of the bicycle moves, and whereby lateral strains are relieved when the tractor unit is prevented by ruts or irregularities in the roadway from following a course exactly parallel with the rear wheel of the bicycle. But it is well understood that in vehicles which are dependent upon locomotion and balancing movements to maintain their equilibrium, short turning movements are almost constantly required, and that additional turning movements are common in order to avoid obstructions or irregularities in the roadway. A motor carrying tractor wheel for driving such a vehicle must be strong enough to support the motor and it therefore contains sufficient mass in the rotating parts to develop gyroscopic effects which seriously interfere with the required short turning movements and tend to render the vehicle sluggish in such movements, and unresponsive to manual control. This is particularly true where the rotating parts of the driving motor are arranged to turn in the same direction as the traction wheel. The gyroscopic force of the engine shaft and fly wheel, if added to that of the traction wheel, not only increases the resistance to turning movements, but accentuates the tilting effects which follow axial displacement, thus increasing the steering and balancing problems, and setting up eccentric strains. It is therefore desirable to not only avoid adding to the gyroscopic force of the traction wheel, but also to counteract or neutralize such gyroscopic force to a sufficient extent to prevent material interference with that ease of control which is so essential to the successful operation of such vehicles.

More specifically stated, therefore, the invention described in this application has for its primary object the provision of means for substantially minimizing or neutralizing gyroscopic action in the driving tractor of a motor driven vehicle dependent upon locomotion and balance for equilibrium. And while my invention is illustrated as applied to a pushing traction wheel auxiliary to a bicycle, it is much broader in scope and includes all possible uses to which a motor carrying single wheel tractor unit may be applied, and particularly so where short or rapid turning movements are to be made, or where axially tilting movements are possible.

In the illustrated embodiment of my invention the traction wheel is dished and has mounted upon its axle a motor, whereby the weight of the motor and the associated parts is substantially centrally located above the point at which the tread of the wheel rests upon the ground. The motor is provided with a casing, or frame, the forward extension of which is adapted to be connected with the frame of the vehicle in a manner which will preferably permit both vertical and lateral turning or vibratory movements. Since the weight of the motor is carried upon the axle of the traction wheel, I have devised a wheel which may be stamped of sheet metal, dished to accommodate the motor and still retain the necessary strength required. By this means I secure a light wheel which has a resiliency sufficient to relieve the motor mechanism of the shocks or jars to which it would otherwise be subjected, and which has the strength necessary to carry the weight of the motor. The wheel is so formed that its distortion is distributed, thereby preventing the crystallization which would otherwise occur at or near the points subjected to the greatest strain.

In the drawings—Figure 1 is a side elevational view of a traction wheel embodying my invention, some of the parts of said wheel being broken away to more clearly reveal the interior construction. Fig. 2 is a vertical sectional view of the traction wheel, the motor associated therewith being shown in elevation. Fig. 3 is a vertical sectional view of the crank case, showing the crank shaft of the engine and the axle upon which the traction wheel is mounted. Fig. 4 is a side elevation of the rear portion of a bicycle equipped with an auxiliary traction wheel embodying my invention. Fig. 5 is a detail view showing a fragment of the lower end of the connector in elevation. Fig. 6 is a detail plan view of the tractor unit and the lower portion of the connector, with dotted lines indicating the lateral turning movements of the traction wheel.

Similar reference characters refer to similar parts throughout the several views.

The traction wheel 7, as illustrated in the drawings, is equipped with a rim 8 and a suitable tread, preferably in the form of a pneumatic tire 9. The hub of the wheel 7 is in the form of a circular plate 11 riveted in position as illustrated. The circular plate 11 is provided with an integral boss 12 provided with a conical bore in which is keyed the conical end 13 of the axle shaft 14, the other end of said shaft being mounted in suitable roller bearings located on the side of the engine frame work opposite the wheel 7. A cap nut 15 threaded upon the right end of the shaft 14, (Fig. 3), secures the wheel to the axle.

The frame 10 supports the motor from the axle shaft 14, roller bearing 19 being interposed between the conical portions 13 of the axle and suitable race rings 18 mounted in the frame, and held therein by retaining nuts 24 which house the packing rings 25. A similar set of bearings are employed at the left hand end of the shaft 14 but are not illustrated, the nature of the bearings being immaterial to the invention herein claimed. A motor crank shaft 21 is journaled in the frame 10 with roller bearings 23 interposed. This shaft carries a pinion 27, which meshes with a gear wheel 26 keyed to the axle shaft 14, the ratio of gear wheel 26 to pinion 27 in the construction illustrated being 8 to 1, whereby the traction wheel will be driven from the crank shaft at only one-eighth of the speed of the fly wheel.

Working cylinder 28, piston 29, connecting rod 30, intake and exhaust valves 32 and 33, ignition magneto 34, and spark plug 31, are substantially the same as illustrated in my co-pending application above referred to, but for the purpose of this invention may be of any ordinary construction. The magneto is bolted to the engine frame at 35 and is provided with a driving pinion 36 meshing with cam shaft gear 26. One terminal of the magneto is grounded and the other terminal is connected with the spark plug 31.

The valves are operated in the same manner as described in the companion application. Part of this mechanism, associated with the exhaust valve, is illustrated as embodying valve stem 38, guided by cylinder boss 39 and carrying a collar or washer 40, which serves as an abutment for spring 41, which normally holds the exhaust valve to its seat. The spring is spaced from the valve rod by a forked spacer 42'. The valve is operated from cam shaft 14 by cam projections 42 and cam actuated plunger 43.

The engine frame is provided with front and rear extensions 46 and 47. The forward projection 46 may be utilized to provide a muffling chamber or passage for exhaust gases delivered thereto through pipe 56. The rear extension 47 of the engine frame may serve as an oil reservoir having a filler aperture normally closed by a plug at 58. Arm 61 supports one end of a mud guard 62, the other end being connected with the forwardly projecting arm 52 formed on plate 51. The mud guard 62 supports fuel tank 63, which has a tube 64 leading to the carbureter with a stop cock interposed, as shown at 65. All of these parts may also be of any ordinary construction and are more fully described in said co-pending application. As they are not specifically claimed herein, detailed description is deemed unnecessary.

It will be observed, (Figs. 4, 5 and 6), that the forwardly projecting arm 52 is provided with an eye 66 to receive a connecting pivot belt 67 extending horizontally through bearings in a coupling member 68 mounted to oscillate upon a connector post 69. This post serves as a means of connection with a bicycle frame to which it is attached at 71 and 73. Turning movements of the coupling member 68 upon the post are resiliently limited by springs 74 and 75 also connected with the bicycle frame. The specific structure and arrangement of these connecting parts are fully described and claimed in the co-pending application and therefore need not be herein set forth with particularity, except to call attention to the fact that they are adapted to permit turning movements of the tractor wheel as well as vertical movements, said turning movements facilitating balancing and steering the bicycle. For the purpose of the present invention, any means for connecting the motor frame with the bicycle frame in such a manner that turning movements will be permitted, are within the scope of the invention claimed herein, and I do not claim in this application any of the features of the connector, nor of its relation to the bicycle frame, except in so far as they coöperate with the fly wheel and tractor in facilitating steering operations of a motor carrying traction wheel which is gyroscopically balanced, or so nearly so as to prevent material interference with steering and balancing movements of the bicycle. In the construction illustrated, the bicycle frame is independently supported, but it is immaterial to the present invention whether the traction wheel supports any portion of the bicycle frame or not. It is, however, essential to the present invention that the fly wheel 22 shall rotate in a direction opposite that of the traction wheel 7. In the construction illustrated, this is accomplished by the single set or pair of intermeshing gears 26 and 27, which connect the crank shaft 21 with the axle 14. The fly wheel 22 is much smaller than the traction wheel 7, but the speed is, as above stated, 8 to 1, and the higher velocity of the fly wheel compensates largely for its comparatively light weight and short diameter as compared with the traction wheel. The weight and the dimensions of the fly wheel are so proportioned with reference to its speed that the gyroscopic force developed therein will substantially equal that developed in the traction wheel, and inasmuch as the traction wheel 7 rotates in a plane parallel with that in which the fly wheel rotates, but in the opposite direction, the gyroscopic force developed in these two wheels is substantially neutralized so far as steering or turning movements of the traction wheel are concerned.

In using the word "substantially" I wish to be understood as referring to a neutralization which reduces the gyroscopic pull to a point where it will not seriously interfere with steering or turning movements. Any fly wheel revolving in an opposite direction from the traction wheel in a structure which is subjected to quick turning or balancing movements, will reduce the gyroscopic force of the traction wheel to some extent and therefore be within the scope of my invention. It is obvious, however, that the gyroscopic force developed in the two wheels may if desired be completely counterbalanced by properly proportioning the parts with reference to mass, diameter and speed.

I wish to be understood that in referring to steering, turning and balancing movements, I have reference more particularly to those sudden and short movements which are required in maintaining the balance of the bicycle and in passing over or around irregularities in the roadway or following the contour of ruts. Such conditions involve quick turning or offsetting movements and these impose great strains upon the traction wheel and upon the vehicle frame with which such wheel is connected, if it is necessary to overcome material gyroscopic resistance. My invention also has value in facilitating turning corners or following curved roadways, but such turning movements are usually gradual, the radius being long and the rider being ordinarily prepared to tilt the vehicle in correspondence with the curve to be followed, and in compensation for all effects of momentum or gyroscopic action.

It will be found that the arms of the rider will be much less affected by fatigue where the gyroscopic forces developed in the tractor unit are wholly or partially neutralized, than in cases where no such neutralization takes place, this being due to the fact that a gyroscopically balanced tractor unit is so much more sensitive to control that little force is required to be exerted in order to guide it, and the more violent turning movements required in maintaining balance under adverse conditions become largely unnecessary.

I claim—

1. A gyroscopically balanced motor carrying traction wheel, in combination with means for connecting such wheel with a vehicle frame, said connecting means being adapted to permit independent turning movements of the traction wheel axle in a horizontal plane.

2. The combination with a traction wheel, a driving motor therefor mounted upon said wheel at one side thereof, with the center of gravity of the wheel and motor substantially in a plane which includes the tread surface of the wheel, and a fly wheel connected with the motor and driven thereby in a direction opposite that of traction wheel rotation, the driving connections between the motor, the fly wheel and the traction wheel being adapted to impart sufficient relative speed to the fly wheel to develop gyroscopic force therein which is substantially equal to the gyroscopic force of the traction wheel, in combination with means for connecting such wheel with a vehicle frame, said connecting means being adapted to permit independent turning movements of the traction wheel axle in a horizontal plane.

3. The combination with a traction wheel, a driving motor therefor mounted upon said wheel at one side thereof with the center of gravity of the wheel and motor substantially in a plane which includes the tread surface of the wheel, a fly wheel connected with the motor and driven thereby in a direction opposite that of traction wheel rotation, and means for connecting the traction wheel with the frame of a vehicle, said connecting means being adapted to permit independent steering movements of the traction wheel.

4. The combination with a vehicle frame, of a motor provided with a frame member connected with the vehicle frame, a single traction wheel supporting the motor, a fly wheel having its axis substantially parallel with that of the traction wheel and supported by the motor frame, driving connections between the motor and the traction wheel and driving connections between the motor and the fly wheel adapted to cause rotation in the opposite direction to that of the traction wheel and means for permitting the motor frame to turn laterally upon its connection with the vehicle frame.

5. A tractor unit, comprising the combination with a traction wheel and a motor carried thereby with its center of gravity substantially in a plane which includes the tread surface of the wheel, said motor being provided with a rotary member connected for movement in a direction opposite that of traction wheel rotation, and having sufficient speed to materially reduce the gyroscopic resistance developed in the traction wheel, and means for connecting said tractor unit with a vehicle frame, said connecting means being adapted to permit independent vertical and lateral movements of the tractor unit.

6. In a tractor unit, organized for driving, steering and balancing movements, the combination with a traction wheel capable of swinging movement about an axis, of a member carried by the wheel and rotating in the opposite direction upon an axis substantially parallel with that of the wheel and adapted to largely neutralize the gyroscopic resistance of the traction wheel to the axially turning movements required for steering and balancing operations.

In testimony whereof I affix my signature in the presence of two witnesses.

REUBEN STANLEY SMITH.

Witnesses:
  LEVERETT C. WHEELER,
  IRMA D. BREMER.